United States Patent Office 3,254,056
Patented May 31, 1966

3,254,056
POLYURETHANE ELASTOMERS FROM A POLY-
ETHER BIS-CHLOROFORMATE AND A DIAMINE
John A. Lovell, Cuyahoga Falls, Ohio, assignor to The
Goodyear Tire & Rubber Company, Akron, Ohio, a
corporation of Ohio
No Drawing. Filed May 23, 1960, Ser. No. 30,743
12 Claims. (Cl. 260—77.5)

This invention relates to polyurethane elastomers and to a process for their preparation. More particularly, this invention relates to the reaction product of a diamine and a bis-chloroformate of a polyether glycol, said polyether glycol being characterized by having adjusted hydrophilic-hydrophobic properties adjacent at least one of its hydroxyls.

There are two principal methods for preparing polyurethane elastomers, namely (Method 1) reacting a reactive hydrogen-containing compound with a polyisocyanate, and (Method 2) reacting a bis-chloroformate with a diamine.

Normally Method 1 gives polyurethane elastomers having superior tensile strength and other properties because the products of Method 1 generally are of higher molecular weight than those of Method 2. Frequently the products of Method 2 are not millable, or if they are millable, appreciable trouble is experienced with the polyurethane elastomer sticking to the mill as a consequence of their low molecular weight. These physical deficiencies of the polyurethane elastomer produced by Method 2 are unfortunate, since Method 2 offers a way to obtain polyurethane elastomers in a water dispersion (sometimes referred to herein as a latex) and possibly at a lower cost. Method 2 can be used to prepare polyurethane elastomers which contain no hydrogens bonded to the urethane nitrogens. This is something that Method 1 cannot do. This difference between the products of these two methods is very significant because polyurethane elastomers free of hydrogen bonding to the urethane nitrogen have the unusual physical properties of very high thermal stability, low specific gravity, and good adhesion and tack.

Polyurethane elastomers containing no hydrogen bonded to the urethane nitrogen were disclosed recently for the first time in British Patent No. 815,122. Although this British patent discloses elastomers having tensile strength comparable with those of the diisocyanate produced polyurethane elastomers, these elastomers were not obtained in accordance with the procedure of Method 2. This patent teaches using either a diisocyanate type cure or extension of a polyurethane diamine (the reaction product of a bis chloroformate with a diamine) with a dicarbonyl chloride compound to obtain high strength elastomers. Hence, this British patent does not teach how to extend a bis chloroformate per se to obtain an elastomer free of hydrogen bonding to the urethane nitrogen having the property of a high dilute solution viscosity (greater than 1), but instead teaches how to produce elastomers free of hydrogen to nitrogen bonding having low dilute solution viscosities (less than 0.5 in Examples 3 and 5 thereof).

Therefore, the principal object of this invention is to provide a method for preparing polyurethane elastomers by Method 2 wherein the polyurethane elastomer will have dilute solution viscosities of at least 1 and preferable in excess of about 1.3 with strength properties substantially equivalent to those of the diisocyanate produced elastomer of Method 1.

A further object of this invention is to provide a method for preparing a novel polyurethane elastomer.

A still further object of this invention is to provide a method for preparing a polyurethane elastomer free of hydrogen bonding to the urethane nitrogen and having a dilute solution viscosity of at least 1.0 and preferably in excess of 1.3 or even 2.0 without the need to resort to the extension of a polyurethane diamine.

Other objects and advantages of this invention will be apparent from the description and claims.

The objects of this invention are accomplished by aqueous interfacial phase extension (sometimes called emulsion phase extension) of a bis chloroformate of an adjusted hydrophilic-hydrophobic polyether glycol with a diamine, said extension occurring at a concentration of said reactants sufficient to give at least 1½ to 4½ mols of the diamine for each mol of bis chloroformate. Briefly, the diamine is dispersed or dissolved normally in a water solution to give a diamine concentration of about 0.1 mol to about 5 mols although other concentrations may be used. It is preferred to use an emulsifying agent to aid in the dispersion of the diamine in the water and to promote contact between the diamine and the bis chloroformate.

A scavenger material for the hydrogen chloride generated when the diamine reacts with bis chloroformate may be added to the water solution, although it is not essential. Normally, basic substance such as sodium hydroxide, triethyl amine, and sodium carbonate are used as scavengers for this hydrogen chloride. The scavenger concentration of these reagents preferably should be less than the amount required stoichiometrically to neutralize all the hydrogen chloride generated. Although the diamine can serve as a scavenger for the hydrogen chloride generated, it does not follow that an excess of a scavenger reagent such as sodium hydroxide can serve to replace part of the excess diamine required relative to the bis chloroformate in this invention.

Although the use of emulsifiers are not essential to the success of this invention, the emulsifiers do aid in obtaining the dispersion of the diamine and in obtaining adequate interfacial contact between the water-diamine solution and the bis chloroformate. The emulsifiers useful in this invention are of the oil-in-water type, such as the water soluble alkali organic sulfonates and the alkali fatty acid soaps including tallates.

Sometimes it is advantageous, although not necessary, to form a pre-emulsion between the water solution and a non-proton accepting solvent prior to the interfacial reaction. This practice is particularly beneficial where the bis chloroformate is relatively viscous and has an extremely high molecular weight. Suitable non-proton accepting solvents may be selected from the classes represented by the liquid hydrocarbons, liquid non-reactive oxygenated hydrocarbons and liquid halogenated hydrocarbons. Representative examples of these solvents are cyclohexane, pentane, benzene, octane, dibutyl ether and certain esters, such as diethyl acetate or glycol esters, methylene dichloride, chlorobenzene, etc.

In the practice of this invention the water solution or pre-emulsion of the diamine is mixed and reacted with the bis chloroformate at a temperature less than about 50° C., since temperatures in excess of this value cause appreciable decomposition and hydrolysis of the bis chloroformate. Generally, it is preferred that the temperature at which the emulsion polymerization or extension occurs should be between 0° C. and 15° C.

In the aqueous interfacial or emulsion extension step, viz, the elastomer formation reaction, the ratio of water solution to bis chloroformate should be controlled to give at least 1.5 and no more than 4.5 mols of diamine for each mol of bis chloroformate used. If the amount of aqueous diamine solution used is insufficient to give a diamine ratio greater than 1 mol for each mol of bis chloroformate, the resulting product will have a low molecular weight and, consequently, will have lower strength properties. Similarly, if the ratio of diamine exceeds about 4.5 mols per mol of bis chloroformate, the resulting product will have similar properties. High strength rubbers are obtained when the diamine concentration is greater than 1.5 mols and not more than about 4.5 mols to each mol of bis chloroformate. Therefore, it is preferred to prepare the polyurethane elastomers at a molar ratio of 2 to 4 mols of diamine for each mol of bis chloroformate. Where this range of molar ratios is not used, the resulting polyurethane elastomer has inferior strength properties and is not desired for building tires, tubes, hose, etc.

Various primary and secondary diamines can be used in this invention. Representative examples of these primary diamines are ethylene diamine; trimethylene diamine; tetramethylene diamine; pentamethylene diamine; hexamethylene diamine; decylene diamine; ortho-meta- and para phenylene diamine; diamines of cyclohexane. Representative examples of the secondary diamines are the methyl, ethyl and related alkyl and aryl derivatives of the listed primary diamines, such as N,N'-diethyl diamino ethane; N,N'-dimethyl ethylene diamines; N,N'-diamyl-1,4-butylene diamine; N,N'-diethyl-1,3-propylene diamine; N,N'-dimethyl-para-phenylene diamine; and N,N'-diamyl-para-phenylene diamine. Normally, the alkyl or aryl derivatives should have less than 10 carbon atoms and preferably should have no more than six carbon atoms. The mixed primary, secondary diamines may be used also.

Generally, the non-cyclic diamines useful in this invention may be represented by the formula

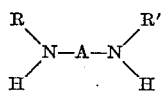

where A is a bivalent radical and R and R' represent hydrogen and hydrocarbon radicals selected from the class consisting of alkyl, aryl, alkaryl, aryl alkyl and cycloalkyl. It should be noted that R and R' may be different or they may be the same. Also, the diamine may be either of the primary or secondary type. Representative examples of the primary non-cyclic type of diamine are ethylene diamine, hexylene diamine, decylene diamine, para diamino benzene and xylene diamine.

Of the disecondary diamines useful in this invention, the cyclic diamines of the piperazine type give polyurethane elastomers which have superior oxidation resistance. This superiority of piperazine for this purpose is thought to result from the fact that oxidation of one of the alpha carbons adjacent to the urethane nitrogen may break the carbon to nitrogen linkage without degrading the elastomer molecule since the carbon to nitrogen bond of the second alpha carbon of the piperazine molecule is still intact. Thus, theoretically, the carbon to nitrogen bonds of both alpha carbon atoms must break before appreciable degradation of the molecule occurs. Since an aqueous interfacial or emulsion polymerization process is used in this invention, those diamines and particularly the disecondary diamines which exhibit at least some water solubility would be preferred over those which do not exhibit water solubility. Hence, the preferred diamines are those which exhibit at least a strong orientation for water or are water soluble, i.e. have less than about ten total carbon atoms and preferably less than seven.

The bis chloroformates useful in this invention can be prepared by the phosgenation with phosgene at about −20 to 10° C. of a polyether glycol characterized by a hydrophobic backbone connected with a hydrophilic group adjacent at least one of the glycol hydroxyls. Normally, the polyether glycol is dissolved in a solvent such as toluene prior to phosgenation thereof.

By the term "hydrophilic group" is meant that the group contains an $-O-(CH_2)_y-$ group adjacent and connected to one of the hydroxyls where $y$ may be an integer from 1 to 3, inclusive. By the term "hydrophobic backbone" is meant that the polyether glycol is comprised primarily of polymethylene hydrophobic groups. These hydrophobic groups may be represented as follows: $-O[(CH_2)_n-O]_x-$ where $x$ is an integer indicating the number of repeating groups present in the backbone and $x$ is of a magnitude sufficiently large to give a polyether glycol having a molecular weight of at least 700 and no greater than about 6000, and $n$ is the number of methylene groups appearing between adjacent ether oxygens. The number of methylene groups appearing between adjacent ether oxygens may be the same in each of the repeating polymethylene oxy groups of the hydrophobic backbone or they may differ in some of the polymethylene groups. For example, where the polymethylene groups are all the same, it is necessary that $n$ have a value of at least 4, although it may be as high as 8 to about 12, or even higher. Where the number of polymethylene groups are not the same in each of the repeating polymethylene oxy groups of the hydrophobic backbone, then some of the polymethylene groups may have values for $n$ as low at 2 or 3 providing a majority of the polymethylene groups present in the hydrophobic backbone have values of $n$ of at least 4 or higher. When the polymethylene groups appearing between adjacent ether oxygens have values of $n$ less than about 4, the backbone will tend to be hydrophilic instead of hydrophobic. Therefore, it is necessary that the backbone contain a predominant number of polymethylene groups having values of $n$ in excess of 3 in order for the bis chloroformate of the polyether glycol to be extendable by Method 2 to give elastomers having relatively high dilute solution viscosities and high strength properties. Thus where the hydrophobic backbone contains polymethylene groups having the same $n$ values in all repeating polymethylene oxy groups, such as where the polyether glycol is prepared from tetrahydrofuran with ethylene oxide as the hydrophilic polymerization initiator, the polyether glycol may be represented as follows:

$$HO-[(CH_2)-O]_x-O(CH_2)_y-OH$$

or $$HO-(CH_2)_y-[(CH_2)_n-O]_x-O-(CH_2)_y-OH$$

in which $n$, $x$ and $y$ have the values defined above.

The preferred polyether glycols for use in this invention are those prepared by the method disclosed and claimed in applicant's copending application Serial Number 30,741 filed May 23, 1960, entitled "Polymeric Glycols" having its oath executed on even date herewith. The polyether glycols of this copending application are comprised primarily of a tetramethylene oxy backbone having connection with an $-O-(CH_2)_y$ group adjacent and connected to at least one of the glycol hydroxyls. Briefly, the hydrophilic-hydrophobic polyether glycols in my copending application may be prepared by polymerizing tetrahydrofuran at a temperature below about 10° C. in the presence of a Lewis acid type catalyst and a hydrophilic initiator capable of yielding an $-O-(CH_2)_y-$ group where $y$ is an integer between 1 and 3, inclusive, with said catalyst being added prior to the initiator and in quantities sufficient to give an excess of catalyts over said initiator, said initiator then being added in sufficient quantities to give at least one mol and no more than 5.5 mols per mol of polymer produced and then hydrolyzing the polymer catalyst complex to hydroxyl terminate said polymer. It should be noted that this order of addition of these reagents should be followed in order to obtain the hydrophilic-hydrophobic ether glycol.

The properties of the polytetramethylene ether glycol produced above can be varied by polymerizing other monomers with the tetrahydrofuran. For example, modifying monomers from the class of alkylene monoxides and epoxy alkyl alkylene ethers may be added to the polymerizing tetrahydrofuran prior to the hydrolysis step and thereby produce polyether glycols having a lower melting point. In addition to lower melting points of the modified polytetramethylene ether glycol, the epoxy alkyl alkylene ethers also introduce pendant unsaturation into the molecule. Representative examples of useful alkylene monoxides of less than ten carbon atoms are propylene oxide-1,2; styrene oxide; butylene oxide-1,2; butylene oxide-2,3; and amylene oxide. Representative examples of useful epoxy alkyl alkylene ethers are epoxy octylene ether, allyl-glycidyl ether and glycidyl vinyl ether. Normally these modifying monomers are used in a minor amount with the repeating oxytetramethylene groups constituting at least 50% by weight of the polyether glycols and the modifying monomers constituting at least about 1 to 30%. A high percent of the modifying monomer can be used where a high degree of pendant unsaturation or low melting points are not objectable. Sometimes it is desirable to use more than one modifying monomer. For example, butylene oxide and allyl glycidyl ether can be polymerized with tetrahydrofuran to yield a polyether glycol having a low melting point and a controlled degree of unsaturation. Where butylene oxide and allyl glycidyl ether both are used as much as 20% of butylene oxide may be used together with a like amount of allyl glycidyl ether. Thus, by using varying amounts of alkylene monoxides, the low temperature properties of the rubber derived therefrom are improved. On the other hand, varying amounts of epoxyalkyl alkylene ether results in its rubber derivative having sulfur curable unsaturation, preferably at least one double bond for at least each 8000 units of elastomer molecular weight with about one double bond for each 500 to 3000 units of molecular weight being preferred.

The Lewis acid type catalyst used for polymerizing tetrahydrofuran are well known and representative examples of suitable catalysts of this type are antimony pentachloride, fluorosulfonic acid, boron trifluoride, boron trifluoride etherate, and a mixture consisting of one part of ferric chloride and one part of thionyl chloride. It is a critical feature of my copending application that the catalyst be added to the tetrahydrofuran before the addition of the hydrophilic initiator.

It should be understood that the products of this invention may be treated normally in the same manner in which synthetic latices are treated to fabricate manufactured articles such as tires, hose, belts, etc. For instance, carbon black and processing oils may be added to the polyurethane elastomer latex or they may be added to the coagulated elastomer on the mill. Hence, the polyurethane elastomers which have no hydrogens bonded to the urethane nitrogen may be compounded with carbon black, silica, metal oxides, plasticizers or other compounding agents ordinarily used in the rubber industry. The curing agents and other compounding materials can be milled into the elastomer on a rubber mill and then the compounded elastomer can be cured by heating at 100° C. to 200° C. under enough pressure to cause the elastomer to assume the shape of the mold. The sulfur-curable polyurethane elastomers of this invention tend to be slow curing and require the use of relatively large amounts of accelerator to shorten the time of cure. Thus the time of cure may vary from a few minutes up to several hours depending on the temperature and the amount of accelerator used. Normally, the lower the temperature and amount of accelerator used, the longer is the curing time.

The process of this invention is illustrated by the following examples in which parts are by weight unless otherwise indicated.

EXAMPLE 1

A. *Preparation of the polyether glycol*

Tetrahydrofuran was charged into a clean, dry, 2-liter resin pot equipped with a stirring assembly, a dry nitrogen inlet tube and a water condenser. The tetrahydrofuran (500 parts) was cooled in the pot to below —15° C. and a blanket of nitrogen maintained. A catalyst solution consisting of boron trifluoride (19.4 parts) dissolved in 200 parts of tetrahydrofuran was added slowly from a dropping funnel to the resin pot. Then a hydrophilic initiator solution consisting of ethylene oxide (9.75 parts) dissolved in 300 parts of tetrahydrofuran was added slowly to the stirring mixture. After about 45 minutes the reaction mixture had warmed to 4° C., then 600 parts of water were added. The mixture was warmed to hydrolyze the catalyst-initiator complex, viz, the boron trifluoride-ethylene oxide-tetrahydrofuran complex. It was washed to remove the last traces of catalyst, etc. Then the water and unreacted monomer were removed by vacuum distillation to obtain a polyether glycol in about 60% yield. This product had a molecular weight of 5430 and no unsaturation. The cooled product was stored in an airtight metal container.

B. *Extension of the polyether glycol by the aqueous bis chloroformate diamine method*

One mol of the polyether glycol of A above was dissolved in 1 mol of toluene and saturated with phosgene at 0° C. After several hours the phosgene was removed by gassing with nitrogen to give a toluene solution of the bis chloroformate of said glycol.

Two mols of piperazine were dissolved in water and this mixture was mixed with a water solution comprising 4 parts of sodium hydroxide and 2 parts of sodium lauryl sulfonate, and 1 liter of water. The resulting mixture was cooled to —5° C. and then the bis chloroformate in toluene solution was slowly stirred into the cooled mixture to obtain a rubbery latex. This latex was coagulated by boiling with additional amounts of water. The coagulate was washed and dried to give a finished elastomer which had good rubbery properties and a dilute solution viscosity of 2.6. The dilute solution viscosity being determined at 30° C. on a solution consisting of 0.3 gram of elastomer and 100 milliliters of chloroform. The dilute solution values given are the natural logarithm of the ratio of solution viscosity to the solvent viscosity divided by the solute concentration.

EXAMPLE 2

*Preparation of the terpolymer of the mixed modified poly-tetramethylene ether glycol*

To prepare this mixed modified polytetramethylene ether glycol the procedure of Example 1 was modified by using 900 parts of tetrahydrofuran, 20 parts of boron trifluoride and 9 parts of ethylene oxide and 50 parts of allyl glycidyl ether dissolved in 15 parts of hexane. The allyl glycidyl ether dissolved in hexane was added to the mixture over a period of about 2 hours prior to the addition of the 600 parts of water. The 600 parts of water was added to the resulting mixture to decompose the initiator-catalyst-polymer complex. This terpolymer had as lightly yellow color, a molecular weight of 3280 with 1 double bond for each 2060 units of molecular weight and a hydroxyl number of 39.2 expressed as milligrams of KOH per gram of polymer.

This terpolymer was converted to the bis chloroformate and extended with piperazine in accordance with the procedure of Example 1(B). The resulting polyurethane elastomer exhibited a slight tendency to gel. In fact the percent gel in chloroform was about 2% by weight. This elastomer had an iodine number of 12 and a dilute solution viscosity of 1.78.

Where quinone or other suitable antioxidants are present during the preparation of the glycol and the extension reaction, the polyurethane elastomer is obtained essentially free of gel, since an antioxidant inhibited gel formation.

EXAMPLE 3

The experiment of Example 2 was repeated except that the order of addition of allyl glycidyl ether was changed. In this example, the allyl glycidyl ether was added to the tetrahydrofuran prior to the addition of either the boron trifluoride or ethylene oxide. The polyether glycol of this experiment had a molecular weight of 2530. When it was phosgenated and extended in accordance with the teachings of Example 1(B), the resulting elastomer had a dilute solution viscosity of less than 1 and exhibited poor milling and banding characteristics. This experiment is excellent confirmation of the criticalness of the order of addition of the hydrophilic initiators, such as ethylene oxide, trimethylene oxide or dioxolane in this invention in order to obtain the desired adjusted hydrophilic-hydrophobic properties in the polyether glycol and thus permit the bis chloroformate of said glycol to be extendable to a high molecular weight elastomer.

EXAMPLE 4

The polymerization of Example 1 was repeated, except 8 parts of trimethylene oxide was used as the hydrophilic initiator instead of ethylene oxide. The molar ratio of trimethylene oxide to boron trifluoride catalyst was 0.05:1 while the molar ratio of the trimethylene oxide to tetrahydrofuran was 0.016:1. The polyether glycol derived from this experiment had a clear, light color and a hydroxyl number of 9.9 and a molecular weight of 11,400. One mol of this copolymer of trimethylene oxide and tetrahydrofuran was converted to the bis chloroformate and extended with piperazine in accordance with the procedure of Example 1(B). The resulting elastomer exhibited excellent physical properties and had a dilute solution viscosity of 1.96.

EXAMPLE 5

*Preparation of a tetrapolymer*

Tetrahydrofuran (750 parts), boron trifluoride (18.8 parts) ethylene oxide (9.75 parts), and allyl glycidyl ether (100 parts) were reacted using the procedure of Example 2 except prior to the addition of the water to hydrolyze the initiator-catalyst polymer complex, 150 parts of propylene oxide was added to the resin pot and was stirred slowly into the terpolymer-catalyst complex and associated ingredients. Then, it was allowed to react for 2 hours before it was hydrolyzed with 600 parts of boiling water. The hydroxyl terminated polytetramer obtained from this experiment was characterized as follows, molecular weight 4675; hydroxyl number 24; iodine number 11.95, which was equivalent to 1 double bond per 2120 units of molecular weight. This hydroxyl terminated tetrapolymer was extended according to the procedure of Example 1(B) except the ratio of bis chloroformate to piperazine was 1:1.5. This elastomer had a gel content of 0.2%, a dilute solution viscosity of 1.43 and an iodine number of 10.4 and 1 double bond per 2420 units of molecular weight. This elastomer could be readily milled and banded.

EXAMPLE 6

*Preparation of another tetrapolymer*

Tetrahydrofuran (750 parts), boron trifluoride (31 parts), ethylene oxide (9.75 parts) and allyl glycidyl ether (65 parts) were reacted according to the procedure of Example 2 except prior to the hydrolysis step 185 parts of butylene oxide was added. This butylene oxide was a mixture of butylene oxide-1,2 and butylene oxide-2,3. This initiator catalyst-polymer complex was hydrolyzed with 600 parts of boiling water to give a tetrapolymer having a molecular weight of 3210, a hydroxyl number of 35, an iodine number of 12.3, a melting point of about −9 to −12° C. and 1 double bond per 2060 units of molecular weight. This material was converted by the procedure of Example 1(B) to a polyurethane elastomer having a relatively high dilute solution viscosity and good milling and banding characteristics as well as good low temperature properties.

EXAMPLE 7

The procedure of Example 6 was repeated except 185 parts of epoxy octane was substituted for the 185 parts of butylene oxide. The tetrapolymer obtained by this substitution had a molecular weight of 2200, a hydroxyl number of 51, an iodine number of 10.3, a melting point of 3° C. to 6° C. and 1 double bond per 2640 units of molecular weight. This hydroxyl-terminated tetrapolymer could be readily extended by the procedure of Example 1(B) to give a polyurethane elastomer of relatively high dilute solution viscosity and good milling and banding characteristics.

When a primary diamine such as hexylene diamine, was used instead of this secondary diamine, the resulting elastomer was characterized by less tack and less compatibility with natural and butadiene-styrene copolymer rubbers.

EXAMPLE 8

The procedure of Example 1 was repeated using 935 parts of tetrahydrofuran, 0.44 mol of antimony pentachloride as the catalyst instead of boron trifluoride, and 0.22 mol of ethylene oxide as the initiator. Then, prior to the water hydrolysis step, 65 parts of allyl glycidyl ether dissolved in 300 milliliters of hexane was added to the reaction mixture. After it had reacted, the initiator-catalyst-polymer complex was decomposed with several volumes of water. The water decomposed this complex to yield a hydroxyl-terminated polymer having a hydroxyl number of 15.1, an iodine number of 16.7 and a molecular weight of 7440. This iodine number represents 1 double bond per 1520 units of molecular weight. This polymer was emulsion polymerized by the procedure of Example 1(B) and the resulting elastomer had good rubbery properties.

EXAMPLE 9

The polymerization procedure of Example 8 was repeated, except 0.44 mol of ferric chloride and 0.44 mol of thionyl chloride were used as the catalyst instead of antimony pentachloride. The polymer obtained had a molecular weight of 11,000, a hydroxyl number of 10.2 and an iodine number of 20.5. This iodine number represented 1 double bond per 2480 units of molecular weight. This polymer was readily extended by the method of Example 1(B) to give a satisfactory elastomer.

EXAMPLE 10

The reaction procedure of Example 1(B) was repeated using different molar ratios of piperazine to bis chloroformate. This variation in the molar ratio of piperazine to bis chloroformate gave elastomers of different dilute solution viscosity as shown in the tabulated data in Table I.

TABLE I

| Ratio of Piperazine to Polyether Bis Chloroformate | Nature of Product | Intrinsic Viscosity |
| --- | --- | --- |
| 4.5:1 | Rubber properties | 1.5 |
| 4:1 | Snappy, easily milled rubber | 2.03 |
| 2:1 | do | 2.13 |
| 1.5:1 | | 1.04 |
| 1:1 | Rubber properties | .75 |
| 0.8:1 | Molding product or fiber | .60 |

EXAMPLE 11

To demonstrate the suitability of various diamines as extending agents for the bis chloroformate of Example 1, several runs were made using diamines other than piperazine in the procedure of Example 1. The results of these runs are tabulated in Table 2.

TABLE 2

| Amine | Molar Ratio, Amine Chloroformate | Nature—Product |
| --- | --- | --- |
| Cis-dimethyl piperzaine | 3.5/1 | Rubbery. |
| Trans-dimethyl piperazine | 3.5/1 | Do. |
| Monoethyl piperazine | 3.5/1 | Do. |
| N,N'-diphenyl-paraphenylene diamine | 3.5/1 | Do. |
| Di-hydro-5,6, phenazine | 3.5/1 | Do. |
| N,N'-dimethyl diamino ethane | 3.5/1 | Do. |

These rubbery polymers had a dilute solution viscosity greater than 1.

EXAMPLE 12

Ethylene diamine was used instead of piperazine as the extension agent in a repeat of the extension procedure of Example 1(B). This polyurethane elastomer had a dilute solution viscosity of 1.63 as compared with 2.07 when piperazine was used. Also, this ethylene diamine elastomer had a lower smear point than the piperazine elastomer and was less tacky and less compatible with butadiene-styrene rubber.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane elastomer having a dilute solution viscosity at 30° C. of at least one when the dilute solution viscosity is measured on a solution consisting of 0.3 gram of said elastomer dissolved in 100 mls. of chloroform comprising the reaction product of
   (1) a diamine, with
   (2) a bis-chloroformate of a polyether glycol having a molecular weight of at least about 700 and less than 6000, said polyetherglycol being the hydroxyl terminated product of a copolymer of tetrahydrofuran and an initiator selected from the group consisting of ethylene oxide, trimethylene oxide and dioxolane, the residue of said initiator being present in each mol of copolymer to the extent of at least 1 mol and no more than an average of 5.5 mols with at least one of its hydroxyls being joined to the copolymer through the group derived from the initiator.

2. A process for producing polyurethane elastomers comprising reacting
   (1) a bis-chloroformate of a polyether glycol with
   (2) a diamine in an aqueous system at a temperature less than about 50° C. with the molar concentration of diamine being from at least about 1.5 to no greater than about 4.5 times the molar concentration of the bis-chloroformate, said polyether glycol having a molecular weight of at least about 700 and less than 6000, said polyetherglycol being the hydroxyl terminated product of a copolymer of tetrahydrofuran and an initiator selected from the group consisting of ethylene oxide, trimethylene oxide and dioxolane, the residue of said initiator being present in each mol of copolymer to the extent of at least 1 mol and no more than an average of 5.5 mols with at least one of its hydroxyls being joined to the copolymer through the group derived from the initiator.

3. A polyurethane elastomer having a dilute solution viscosity at 30° C. of at least about one when the dilute solution viscosity is measured on a solution consisting of 0.3 gram of said elastomer dissolved in 100 ml. of chloroform, said elastomer comprising the reaction product of
   (1) an organic diamine with
   (2) a bis-chloroformate of a polyether glycol having a molecular weight of about 700 to less than 6000, said polyether glycol being the hydroxyl terminated product of a polymer of tetrahydrofuran, an initiator and a modifying monomer selected from the class consisting of alkylene mono-oxide and epoxy alkyl alkylene ether, said initiator being selected from the class consisting of ethylene oxide, trimethylene oxide and dioxolane, the residue of said initiator being present in each mol of polymer to the extent of at least one mol and no more than an average of 5.5 mols with at least one of its hydroxyls being joined to the polymer through the group derived from the initiator.

4. The elastomer of claim 3 wherein the diamine is a secondary amine.

5. The elastomer of claim 3 wherein the diamine is piperazine.

6. The process of claim 3 wherein the aqueous system contains a basic scavenger other than the diamine for at least part of the hydrogen chloride formed during the extension reaction.

7. A process for producing polyurethane elastomers comprising reacting
   (1) a bis-chloroformate of a polyether glycol of about 700 to less than 6000 molecular weight with
   (2) a diamine in an aqueous system at a temperature less than about 50° C. with the molar concentration of the diamine being from at least 1.5 to no greater than about 4.5 times the molar concentration of the bis chloroformate, said polyether glycol having a molecular weight of at least about 700 and less than 6000, said polyetherglycol being the hydroxyl terminated product of a copolymer of tetrahydrofuran and an initiator selected from the group consisting of ethylene oxide, trimethylene oxide and dioxolane, the residue of said initiator being present in each mol of copolymer to the extent of at least 1 mol and no more than an average of 5.5 mols with at least one of its hydroxyls being joined to the copolymer through the group derived from the initiator.

8. The process of claim 7 wherein the diamine is a secondary organic diamine.

9. The process of claim 7 wherein the diamine is piperazine.

10. A process for producing polyurethane elastomers comprising reacting
    (1) a bis-chloroformate of a polyether glycol of about 700 to less than 6000 molecular weight with
    (2) a diamine in an aqueous system at a temperature less than about 50° C. with the molar concentration of the diamine being from at least 1.5 to no greater than about 4.5 times the molar concentration of the bis-chloroformate, said polyether glycol having a molecular weight of about 700 to less than 6000, said polyether glycol being the hydroxyl terminated product of a polymer of tetrahydrofuran, an initiator and a modifying monomer selected from the class consisting of alkylene mono-oxide and epoxy alkyl alkylene ether, said initiator being selected from the class consisting of ethylene oxide, trimethylene oxide and dioxolane, the residue of said initiator being present in each mol of polymer to the extent of at least one mol and no more than an average of 5.5 mols with at least one of its hydroxyls being joined to the polymer through the group derived from the initiator.

11. The process of claim 10 wherein the organic diamine is a secondary diamine.

12. The process of claim 10 wherein the organic diamine is piperazine.

References Cited by the Examiner

UNITED STATES PATENTS

| | | | |
|---|---|---|---|
| 2,808,391 | 10/1957 | Pattison | 260—77 |
| 2,913,496 | 11/1959 | Cluff | 260—77.5 |
| 2,927,098 | 3/1960 | Goldberg | 260—77.5 |
| 2,970,987 | 2/1961 | Wittbecker | 260—77.5 |
| 2,987,494 | 6/1961 | Black | 260—77.5 |
| 2,990,396 | 6/1961 | Clark et al. | 260—2 |
| 3,022,255 | 2/1962 | Morschel et al. | 260—2 |

LEON J. BERCOVITZ, *Primary Examiner.*

PHILLIP E. MANGAN, HAROLD BURSTEIN,
*Examiners.*

T. D. KERWIN, J. T. BROWN, M. C. JACOBS,
*Assistant Examiners.*